US006681867B2

(12) United States Patent
Satzler

(10) Patent No.: US 6,681,867 B2
(45) Date of Patent: Jan. 27, 2004

(54) OSCILLATING GROUND ENGAGING TOOL

(76) Inventor: Ronald L. Satzler, 16615 W. Streitmatter Rd., Princeville, IL (US) 61559

( * ) Notice: Subject to any disclaimer, the term of this patent is extended or adjusted under 35 U.S.C. 154(b) by 33 days.

(21) Appl. No.: 09/887,155

(22) Filed: Jun. 25, 2001

(65) Prior Publication Data

US 2002/0195259 A1 Dec. 26, 2002

(51) Int. Cl.[7] .............................................. A01B 33/00
(52) U.S. Cl. ......................................... 172/619; 37/447
(58) Field of Search ................................ 172/730, 619, 172/657, 661, 699, 711, 50, 53, 54, 97, 21, 22; 37/904, 447, 404; 405/182, 183

(56) References Cited

U.S. PATENT DOCUMENTS 3,552,497 A * 1/1971 Stedman ..................... 172/292
3,770,322 A * 11/1973 Dunn ......................... 384/276
3,863,721 A * 2/1975 Scerbo et al. ................. 172/40
4,038,828 A 8/1977 Schuck et al.
4,164,982 A * 8/1979 Draney ........................ 172/40
4,252,376 A * 2/1981 Gurries ...................... 299/37.2
4,343,514 A * 8/1982 Gurries ...................... 299/37.2
4,377,914 A 3/1983 Draney et al.
4,453,772 A * 6/1984 Roussin ..................... 299/37.5
4,463,509 A * 8/1984 Leonard ..................... 405/182
4,564,075 A 1/1986 Chekouras
4,750,566 A * 6/1988 Lindstrom ................... 172/40
4,834,461 A * 5/1989 Fidler et al. ............... 299/37.5
5,121,800 A * 6/1992 Gabriel ........................ 172/54
5,499,686 A 3/1996 Parker
5,954,139 A 9/1999 Forsyth
6,000,477 A 12/1999 Campling et al.
6,517,164 B1 * 2/2003 White ....................... 299/37.5

* cited by examiner

*Primary Examiner*—Thomas B. Will
*Assistant Examiner*—Kristine Florio
(74) *Attorney, Agent, or Firm*—Sugrue, Mion, Zinn, Macpeak & Seas

(57) ABSTRACT

A ground engaging tool that oscillates in a motion, relative to the ground, that is substantially vertically upward, and then downward and forward in a direction in which the apparatus is moved.

19 Claims, 6 Drawing Sheets

OSCILLATING GROUND ENGAGING TOOL

TECHNICAL FIELD

This invention relates generally to ground engaging tools and, more particularly, to a ground engaging tool that exhibits an oscillating motion.

BACKGROUND

Conventional ground engaging tools, such as tools used to do primary tillage (sometimes referred to as "rippers"), use a lot of energy and often wear out the ground engaging tool (hereinafter referred to as a "GET") in a relatively short time (e.g., after 100 hours of use). An example of such a tool is shown in U.S. Pat. No. 5,499,686, issued Mar. 19, 1996, to Paul D. Parker for a DEEP TILLAGE WINGED SWEEP. The fracture energy is high because the soil tends to be forced and moved in a horizontal or forward direction rather than a vertical direction. The friction energy, which wears out the GET, is high because of the soil pressure on the GET and the high relative velocity between the soil and the GET. Conventional rippers generally leave the soil surface in an undesirable state. Additional operations and costs are needed to redo the soil surface to a smooth condition. These additional operations damage the density profile of the soil, reducing the crop yield.

The present invention is intended to overcome or minimize the above-described problems.

SUMMARY OF THE INVENTION

According to one aspect of the invention, a tilling apparatus includes a ground engaging tool that oscillates in a motion, relative to the ground, that is substantially vertically upward, and then downward and forward in a direction in which the apparatus is moved.

According to another aspect of the invention, a linkage assembly for a ground engaging tool includes a four-bar linkage assembly that causes the ground engaging tool to repeatedly move in a first direction to lift a section of the ground, and then a second direction to position the ground engaging tool under the next section of ground.

According to another aspect of the invention, in a vehicle having a tilling apparatus movably associated with the vehicle, the tilling apparatus includes a ground engaging tool, and a linkage assembly operatively connected to the ground engaging tool to cause it to oscillate in a motion, relative to the ground, that is substantially vertically upward, and then downward and forward.

According to another aspect of the invention, a tilling method using a tilling apparatus includes repeatedly moving a ground engaging tool in a first direction to lift a section of a material being tilled, and then a second direction to position the ground engaging tool under the next section of material being tilled.

DETAILED DESCRIPTION

Figure 1:
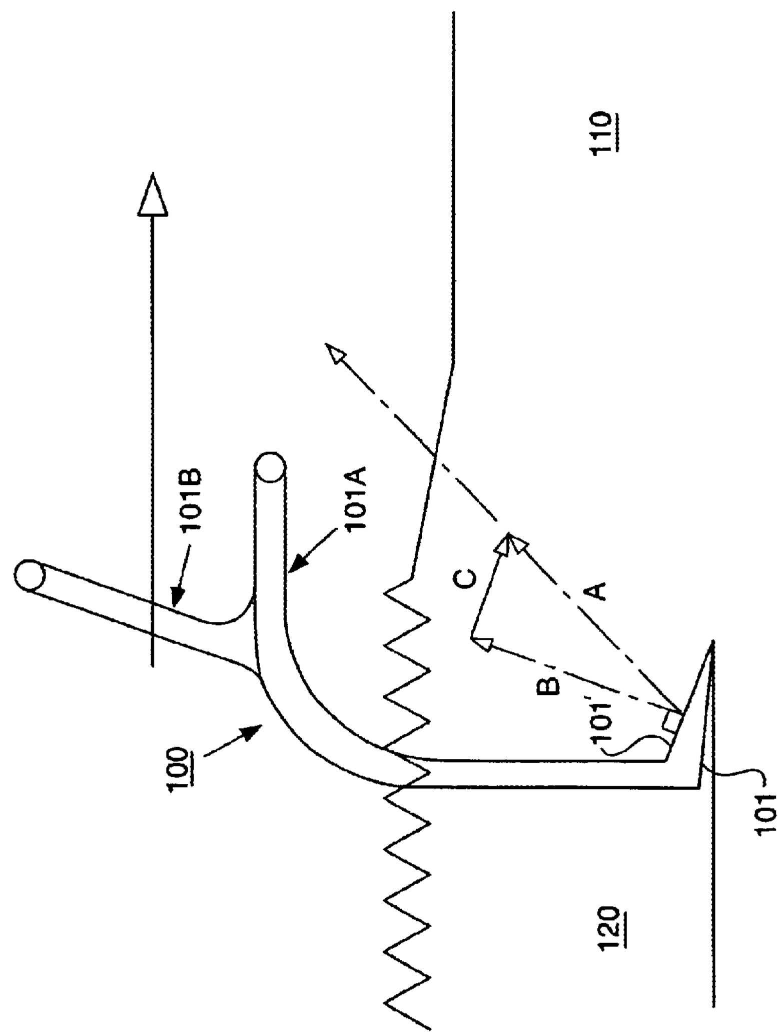
FIG. 1 shows an example of a ground engaging tool according to an embodiment of the present invention.

FIG. 1 shows a ripper 100, as one embodiment of the present invention, having a ground engaging tool or GET 101 for fracturing compacted soil 110. The ripper 100 and GET 101 are being pulled from left to right in FIG. 1 to create the fractured soil 120. As the GET 101 is pulled from left to right, it exerts a force A on the compacted soil. This force A has two force components, B and C. Force component B is perpendicular to the lifting surface 101' of the GET 101, and tends to lift the soil. Force component C is a smaller force than force component B and is exerted in a direction perpendicular to force component B. Force component C tends to push the soil forward as it is being lifted by the GET 101. The total energy required to pull the GET 101 in the direction shown in FIG. 1 is equal to the energy required to fracture the soil plus the energy expended due to friction between the GET 101 and the soil.

Figure 2:
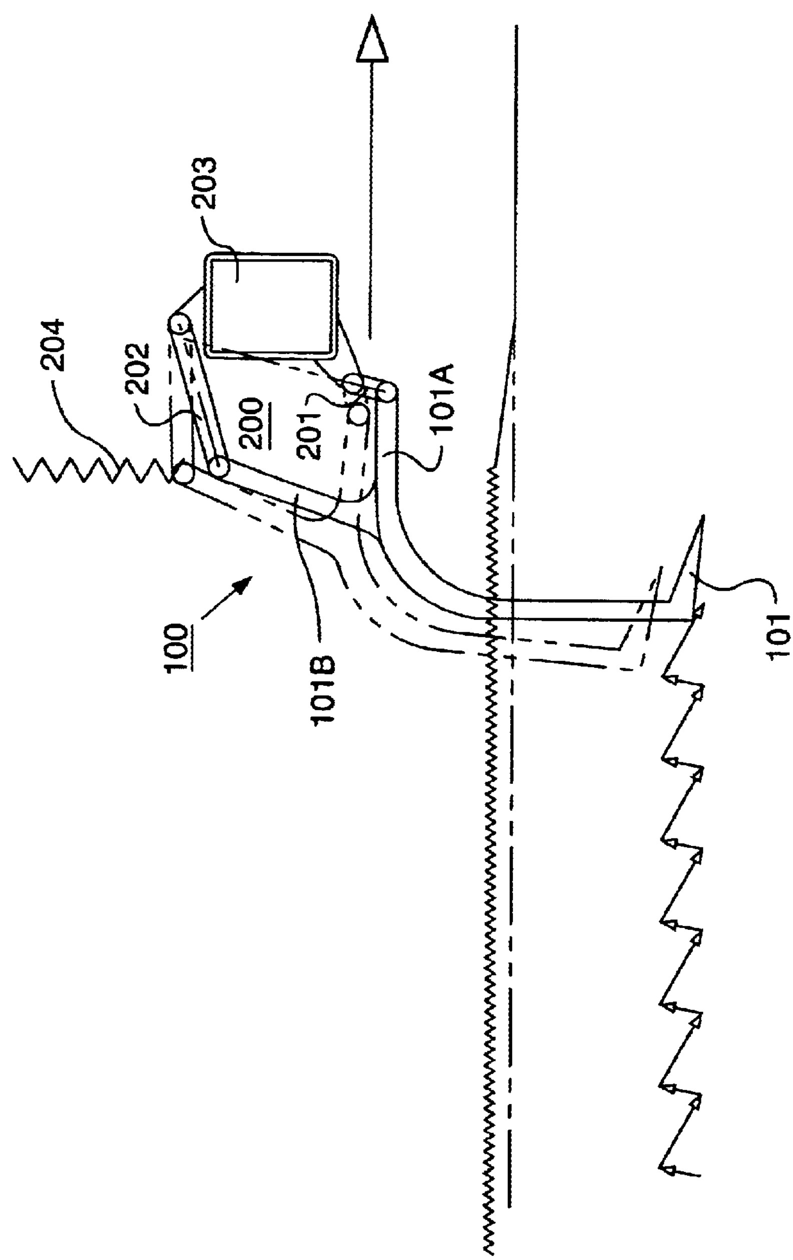
FIG. 2 shows an example of a linkage assembly according to an embodiment of the present invention for producing an oscillating motion.

FIG. 2 shows a four-bar linkage assembly 200 for operating the GET 101. If it is desirable to actuate the oscillation cycle without auxiliary power, such a four-bar linkage system can be used. A lower link 201 is pivotally connected at one end to lower arm 101A of a shank portion of the ripper 100 and at the other end to a frame 203, and an upper link 202 is pivotally connected at one end to upper arm 101B of the shank portion of the ripper 100 and at the other end to the frame 203. The four-bar linkage assembly 200 is formed by the lower link 201, the upper link 202, the shank portion of the ripper 100 (having lower arm 101A and upper arm 101B), and the frame 203.

A spring 204 (FIG. 2) may be provided to improve the jab of the GET 101. The spring is compressed during lift of the GET 101, and its spring energy is used to accelerate the jab speed of the GET 101. Different types of springs could be used. By way of example only, such springs might include a mechanical pull spring, a leaf spring, a pneumatic spring, and a hydraulic spring with accumulator. Instead of a spring, other acceleration generating devices could be used. By way of example only, such other acceleration generating devices might include a hydraulic cylinder with secondary power source and a linear electric motor/generator connected to a capacitor.

Figure 3:
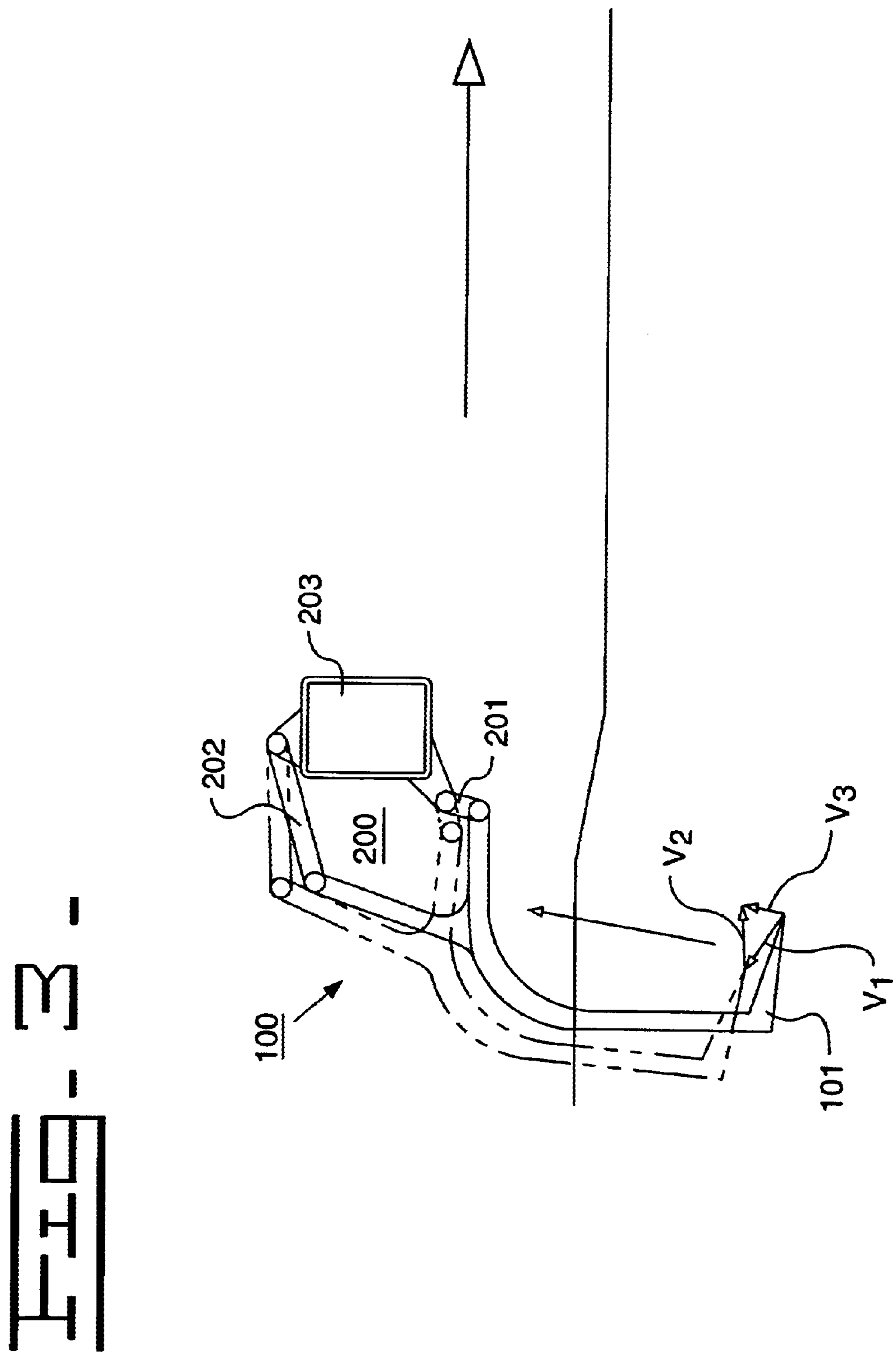
FIG. 3 is an explanatory diagram of the movement of the ground engaging tool in a lift phase.

The path of the oscillation of the GET 101, relative to the main frame 203 of the ripper 100 is upward and rearward during lift, as shown by vector $V_1$ in FIG. 3. However, because of the forward motion of the frame 203 (see vector $V_2$ in FIG. 3), the GET 101 will tend to move generally vertical relative to the soil during the lift portion of the cycle, as shown by vector $V_3$ in FIG. 3, in the direction of minimal resistance (minimum fracture energy). During the jab portion of the cycle, the GET 101 moves downward and forward. The forward speed of the GET 101 may exceed the forward travel speed of the frame 203, so that the GET 101 "catches up."

Figure 4:
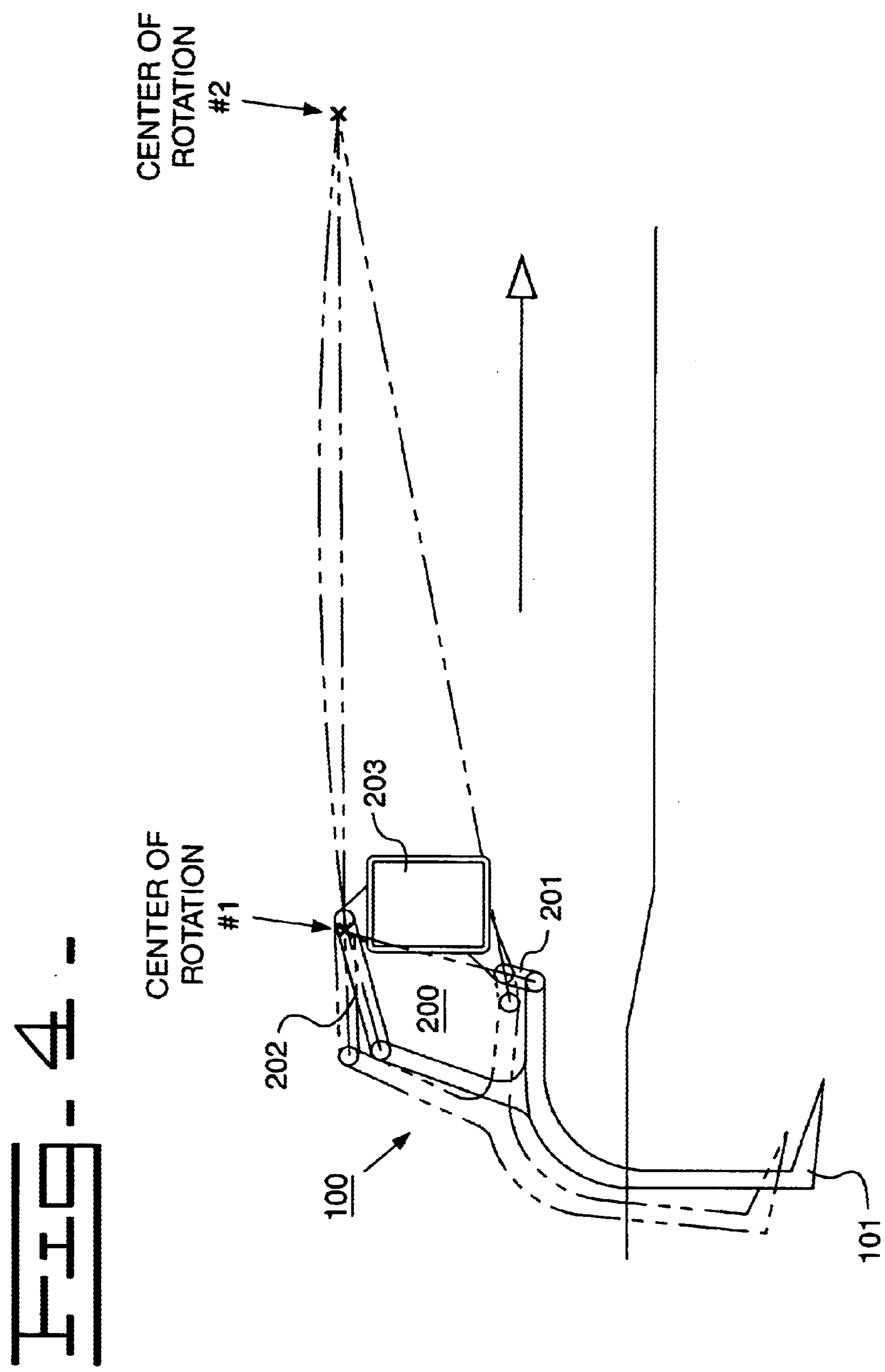
FIG. 4 is an explanatory diagram showing different centers of rotation of the linkage assembly.

As shown in FIG. 4, the four-bar linkage assembly 200 has more than one center of rotation. A first center of rotation (center of rotation #1) is formed when the ripper 100 is in its lowest position, and a second center of rotation (center of rotation #2) is formed when the ripper 100 is in its uppermost position. The centers of rotation are defined as the intersection between imaginary lines extending from each link in the length directions of the links, as shown by the dashed lines. As can be seen in FIG. 4, the center of rotation for the ripper 100 and, therefore, the GET 101 moves a relatively long distance in the fore/aft direction, as the ripper 100 moves between its uppermost and lowermost positions. When the GET 101 is at its lowermost position (solid lines in FIG. 4, and also shown in FIG. 5), the center of rotation (center of rotation #1) is generally above the GET 101, and the GET 101 is ready to lift the soil. When the GET 101 is at its uppermost position (dashed lines in FIG. 4, and also shown in FIG. 6), the center of rotation (center of rotation #2) is relatively far forward of the GET 101, and the GET 101 is ready to jab forward and downward under the next section of soil.

Figure 5:
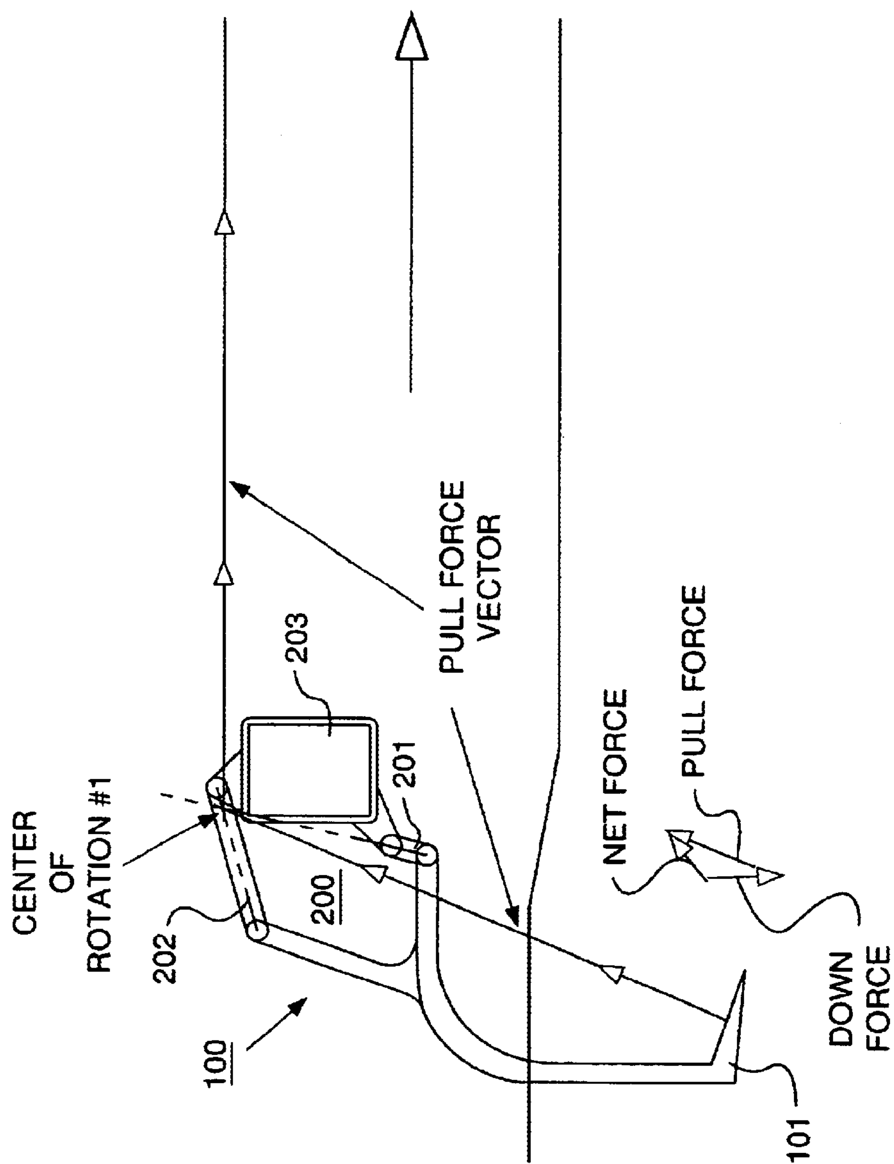
FIG. 5 is an explanatory diagram showing a first center of rotation.

In FIG. 5, the ripper 100 is at its lowermost position, and the ripper 100 pivots about the center of rotation #1. In other words, the center of rotation has an effect as if the ripper 100 is pivotally pinned to the frame 203 at that point. A load pulled through a pin joint forces the force vector to go through the pin joint. Thus, as shown in FIG. 5, the pull force vector extends from the GET 101 through the center of rotation #1 and towards the towing vehicle. The net force is determined by the addition of the force vectors for the down force and pull force, as shown in FIG. 5.

Figure 6:
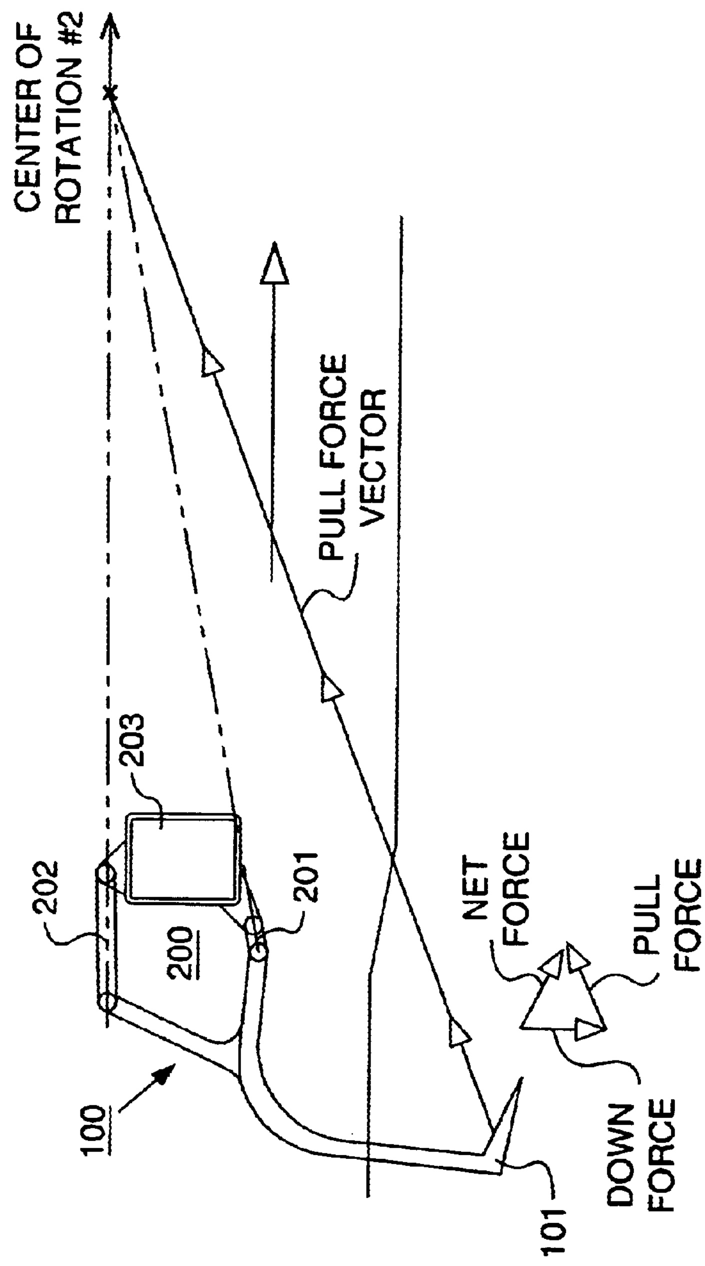
FIG. 6 is an explanatory diagram showing a second center of rotation.

In FIG. 6, the ripper 100 is at its uppermost position, and the ripper 100 pivots about the center of rotation #2. In other words, the center of rotation has an effect as if the ripper 100 is pivotally pinned to the frame 203 at that point. A load pulled through a pin joint forces the force vector to go through the pin joint. Thus, as shown in FIG. 6, the pull force vector extends from the GET 101 through the center of rotation #2 and towards the towing vehicle. The net force is determined by the addition of the force vectors for the down force and pull force, as shown in FIG. 6.

Industrial Applicability

The GET 101 oscillates in a motion that tends to lift the soil substantially vertically in order to minimize the fracture energy. After lifting, the GET 101 jabs forward and downward to complete the oscillation cycle and position itself under the next section of soil. During lift, the GET 101 experiences minimal relative motion between it and the soil. During the jab portion of the cycle, the average pressure between the soil and the GET 101 is low. Therefore, the oscillation cycle results in lower friction energy and lower wear. In addition, lifting the soil vertically tends to minimize the soil surface disturbance. As one example, the soil can be heaved rather than boiled.

While the above-described embodiment relates to a ripper device, the invention is not intended to be limited to such a device and, consequently, other ground engaging tools could incorporate the features of the present invention.

Other aspects, objects and advantages of this invention can be obtained from a study of the drawings, the disclosure and the appended claims.

What is claimed is:

1. A tilling apparatus, comprising:

a ground engaging tool that oscillates in a motion, relative to the ground, that is substantially vertically upward, and then downward and forward in a direction in which the apparatus is moved.

2. The tilling apparatus recited in claim 1, further including a linkage assembly that causes said ground engaging tool to oscillate in said motion.

3. The tilling apparatus recited in claim 2, wherein said linkage assembly is a four-bar linkage assembly.

4. The tilling apparatus recited in claim 3, wherein the four-bar linkage assembly includes a relatively long upper link and a relatively short lower link, and wherein a center of rotation of the four-bar linkage assembly is shifted by movement of the ground engaging tool between uppermost and lowermost positions of the ground engaging tool.

5. The tilling apparatus recited in claim 4, wherein the center of rotation is located generally above the ground engaging tool when the ground engaging tool is in its lowermost position, and relatively far forward of the ground engaging tool when the ground engaging tool is in its uppermost position.

6. The tilling apparatus recited in claim 3, wherein the four-bar linkage is configured so that the ground engaging tool moves generally upward and rearward as it is raised and generally downward and forward as it is lowered.

7. The tilling apparatus recited in claim 3, further including means for accelerating movement of the ground engaging tool.

8. The tilling apparatus recited in claim 7, wherein said accelerating means comprises a spring.

9. In a vehicle having a tilling apparatus movably associated with said vehicle, the tilling apparatus comprising:

a ground engaging tool; and a linkage assembly operatively connected to said ground engaging tool, said linkage assembly causing said ground engaging tool to oscillate in a motion, relative to the ground, that is substantially vertically upward, and then downward and forward in a direction in which said vehicle is moved.

10. The vehicle recited in claim 9, wherein said linkage assembly is a four-bar linkage assembly.

11. The vehicle recited in claim 10, wherein the vehicle includes a frame, and wherein the frame forms part of said four-bar linkage assembly.

12. The vehicle recited in claim 11, wherein said four-bar linkage assembly further includes two links and a shank portion of said ground engaging tool.

13. The vehicle recited in claim 12, wherein said links have different lengths.

14. The vehicle recited in claim 10, wherein the four-bar linkage assembly is configured so that said ground engaging tool moves generally upward and rearward as it is raised and generally downward and forward as it is lowered.

15. The vehicle recited in claim 10, wherein a center of rotation of said four-bar linkage assembly is shifted with movement of said ground engaging tool between lowermost and uppermost positions of said ground engaging tool.

16. The vehicle recited in claim 15, wherein the center of rotation is located generally above said ground engaging tool when said ground engaging tool is in its lowermost position, and relatively far forward of said ground engaging tool when said ground engaging tool is in its uppermost position.

17. A method for tilling using a tilling apparatus having a ground engaging tool, comprising:

repeatedly moving the ground engaging tool of the tilling apparatus in a motion, relative to the ground, that is substantially vertically upward, and then downward and forward in a direction in which the apparatus is moved.

18. The method recited in claim 17, wherein said moving step is performed using a linkage assembly operatively connected to the ground engaging tool.

19. The method recited in claim 18, wherein the linkage assembly is a four-bar linkage assembly to obtain the oscillatory motion.

* * * * *

UNITED STATES PATENT AND TRADEMARK OFFICE

CERTIFICATE OF CORRECTION

PATENT NO. : 6,681,867 B2
DATED : January 27, 2004
INVENTOR(S) : Ronald L. Satzler It is certified that error appears in the above-identified patent and that said Letters Patent is hereby corrected as shown below:

Title page,
Item [73], Assignee, should read -- Caterpillar Inc. --

Signed and Sealed this

Twenty-second Day of June, 2004

JON W. DUDAS
*Acting Director of the United States Patent and Trademark Office*